United States Patent [19]
Ohsawa

[11] Patent Number: 5,572,013
[45] Date of Patent: Nov. 5, 1996

[54] FOCUS DETECTION APPARATUS WITH A LIGHT SHIELDING MEMBER

[75] Inventor: Keiji Ohsawa, Tokyo, Japan

[73] Assignee: Nikon Corporation, Tokyo, Japan

[21] Appl. No.: 485,121

[22] Filed: Jun. 7, 1995

Related U.S. Application Data

[63] Continuation of Ser. No. 212,810, Mar. 15, 1994, abandoned.

[30] Foreign Application Priority Data

Mar. 15, 1993 [JP] Japan ..................................... 5-080181

[51] Int. Cl.$^6$ ..................................................... G01J 1/20
[52] U.S. Cl. ............................................ 250/201.8; 396/114
[58] Field of Search ............................... 250/201.7, 201.6, 250/201.2, 237 R, 204, 201.8, 201.4; 354/407, 402, 406, 408

[56] References Cited

U.S. PATENT DOCUMENTS

| | | | |
|---|---|---|---|
| 4,357,086 | 11/1982 | Shimomura et al. | 354/407 |
| 4,857,718 | 8/1989 | Karasaki et al. | |
| 4,974,007 | 11/1990 | Yoshida . | |
| 5,393,969 | 2/1995 | Ohsawa | 354/407 |
| 5,397,887 | 3/1995 | Sensui | 354/407 |

FOREIGN PATENT DOCUMENTS

1-282513  11/1989  Japan .

Primary Examiner—Georgia Y. Epps
Assistant Examiner—Jacqueline M. Steady

[57] ABSTRACT

A focus detection apparatus adapted to reform images of light fluxes that pass through differing regions of a photographic lens into a pair of images on light receiving element arrays by using, for each pair of images, a field mask, a field lens, a pair of re-imaging lenses and an aperture mask having a pair of aperture openings provided in the vicinity of the pair of re-imaging lenses. The focus detection apparatus has multiple focus detection blocks that detect the focus condition of the photographic lens from positions relative to the pairs of images. The focus detection apparatus is further adapted to detect the focus condition of multiple areas on a focal plane. The focus detection apparatus includes a deflection mirror positioned between the field lens and the pair of re-imaging lenses. The deflection mirror causes the light fluxes to be deflected at nearly right angles for focus detection. Finally, a light shielding member is positioned in a triangular space determined by a beam of light for focus detecting that is closest to the pair of re-imaging lenses, a beam of light for focus detecting that is closest to the field lens and a reflecting surface of the deflection mirror.

14 Claims, 7 Drawing Sheets

FOCUS DETECTION APPARATUS WITH A LIGHT SHIELDING MEMBER

RELATED CASE INFORMATION

This application is a continuation of U.S. patent application Ser. No. 08/212,810 filed Mar. 15, 1994, now abandoned.

BACKGROUND OF THE INVENTION

1. Field of the Invention

The present invention relates to multi-area focus detection apparatuses used in cameras.

2. Description of the Related Art

In the past, multi-area focus detection apparatuses which could simultaneously measure not only the axial area located on the optical axis of the photographic lens but also off-axial areas located far from the optical axis, were proposed as focus detection apparatuses to be used in cameras and in other optical devices. Such multi-area focus detection apparatuses typically include enough multiple focus detection optical systems to detect the focus condition of a corresponding number of single focus areas. The problems associated with such well-known systems and the methods implemented for resolving such problems, are indicated in Japanese Patent Publication No. 63-289513 (hereinafter the "JP-'513" reference). The conceptual composition of an embodiment of JP-'513 is shown in FIG. 4.

Figure 4:
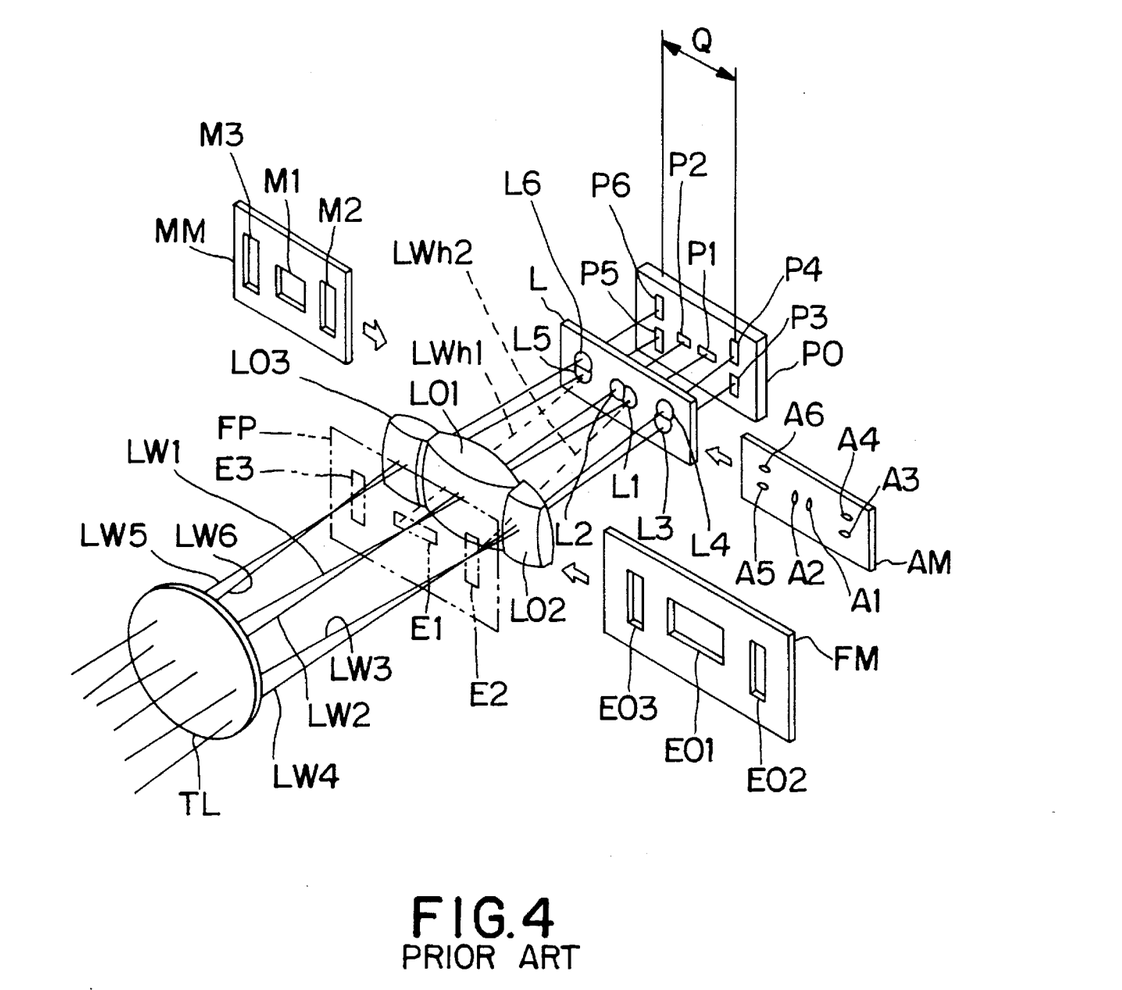
FIG. 4 is an exploded view diagram which shows an abbreviated configuration of an exemplary focus detection apparatus according to the prior art.

The apparatus depicted in FIG. 4 detects the focus condition of the area on the optical axis of the photographic lens as well as two areas off the optical axis, for a total of three areas. In order to indicate the positions on the focal plane FP of the photographic lens TL, these areas have been arranged in an overall H shape such that area E1 is on the optical axis and extends horizontally on the focal plane FP. Area E1 is flanked by areas E2 and E3 which are off the optical axis and extend vertically on the focal plane FP. in each of these areas, the six light fluxes (LW1, LW2) through (LW5, LW6) pass through differing regions of photographic lens TL and thereafter pass through their respective field lenses L01 through L03. Images are formed on the light receiving parts (P1, P2) through (P5, P6) on the CCD line sensor PO based on the three pairs of re-imaging lenses (L1, L2) through (L5, L6). The focus condition of the photographic lens TL is detected in each area from the relation of the respective images.

Field mask FM has openings E01 through E03 that regulate the range of the area to be used for detecting. Field mask FM is positioned directly in front of field lenses L01 through L03. Aperture mask AM has openings (A1, A2) through (A5, A6) onto which the emergent light pupil of the photographic lens TL is projected by field lenses L01 through L03 and by which the range of light fluxes to be used passes through the emergent light pupil are stipulated. Aperture mask AM is positioned in front of re-imaging lens L which is composed of three pairs of lenses (L1, L2) through (L5, L6). For any one area, for example area E1 on the optical axis, aperture E01 of field mask FM, field lens L01, the pair of openings (A1, A2) of aperture mask AM, and the pair of light receiving parts (P1, P2) of CCD line sensor P0 compose a focus detection optical system, and as a whole, the system takes a form that provides enough focus detection optical systems for the number of areas.

With the aforementioned kind of focus detection apparatuses equipped with multi-area focus detection optical systems, there is a problem in that size constraints play a major role in the cost and implementation of such multi-focus systems. For example, because the light fluxes to be used are close together, trying to reduce the size of CCD line sensor P0 in order to make a compact device (when trying to make Q smaller in FIG. 4), light fluxes outside the corresponding areas, or so-called harmful light, falls on the light receiving part of the CCD sensors (LWh1, LWh2 etc. indicated by dotted lines in FIG. 4), and the precision of focus detection is reduced. Thus, in order to solve this problem, harmful light is shielded by positioning light shielding member MM, which has three openings M1 through M3, between field lenses L01 through L03 and re-imaging lens L such that only the light fluxes to be used pass therethrough.

Figures 5A, 5B, 5C:
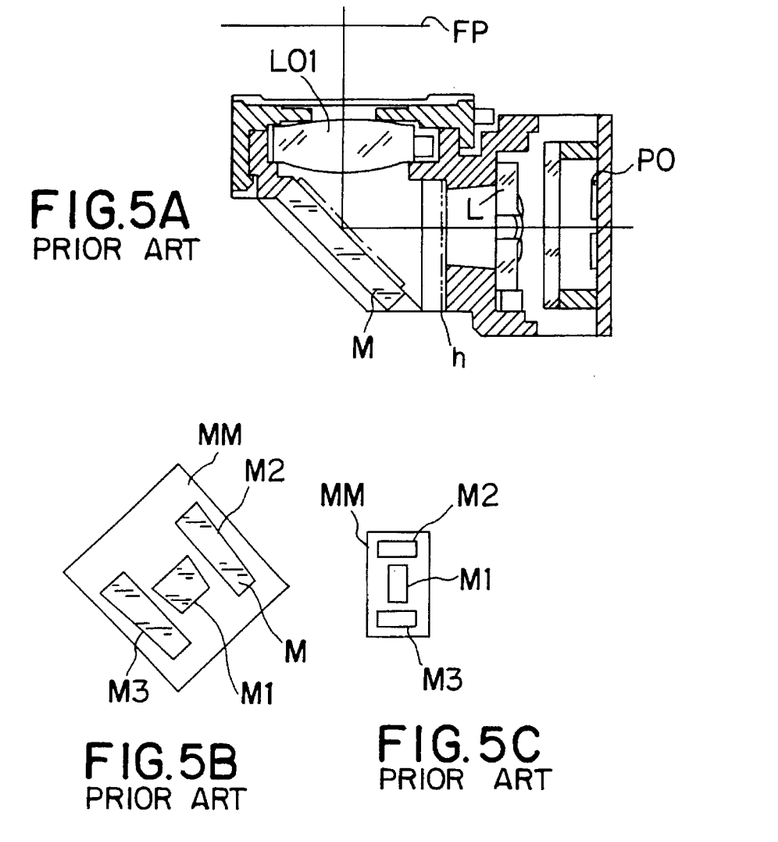
FIGS. 5A–5C are cross-sectional explanatory diagrams which show the arrangement of a light shielding member mounted in a camera of an exemplary focal point detection device according to the prior art.

Referring now to FIGS. 5A–5C, there is illustrated the arrangement of harmful light shielding member MM in the state when the focus detection apparatus cited in Japanese Patent Publication No. 63-289513 is mounted in a camera. When the focus detection apparatus is mounted in a camera, in order that the camera does not become too large, deflection mirror M is arranged between field lenses L01 through L03 (not shown) and re-imaging lens L, and generally the space within the camera is effectively used by bending or deflecting the light fluxes to be used in a direction that is nearly at a right angle to the photographic lens. In the aforementioned Japanese Patent Publication No. 63-289513, light shielding member MM is positioned at a right angle to the optical axis of the light fluxes to be used at position h between re-imaging lens L and deflection mirror M, or it is positioned by affixing it on the surface of bending mirror M.

Figure 6:
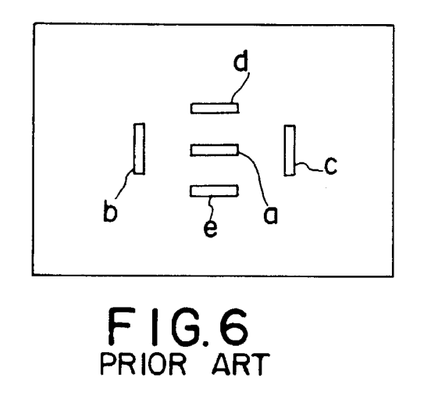
FIG. 6 is an explanatory diagram which shows an exemplary arrangement of the focus detecting areas in a multi-area focus detection apparatus.

On the other hand, Japanese Patent Publication No. 62-189415 proposes a multi-area focus detection apparatus that provides focus detecting areas off the optical axis not only to the left and right, but also above and below. The arrangement of these areas is indicated in FIG. 6. Off-axial areas d and e are added to a central area on the optical axis and are positioned above and below the optical axis. Off-axial areas b and c are added to the left and right of the optical axis. Areas d and e are parallel with a central area on the optical axis, and are areas that are extended horizontally on the focal plane. Moreover, if this area arrangement is developed a little more, as shown in FIG. 7, a cross shape could be used for the central area on the optical axis which has a high frequency of use so that focus detection is possible whether the subject is horizontal or vertical.

Figure 7:
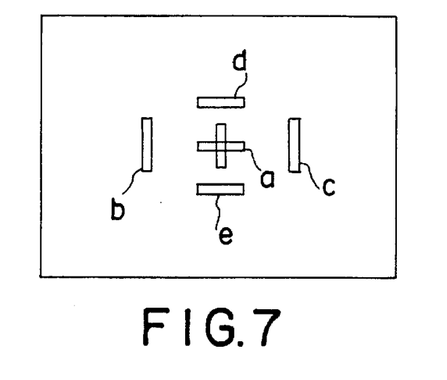
FIG. 7 is an explanatory diagram illustrating another example of the arrangement of focus detecting areas in a multi-area focus detection apparatus.
Figure 8:
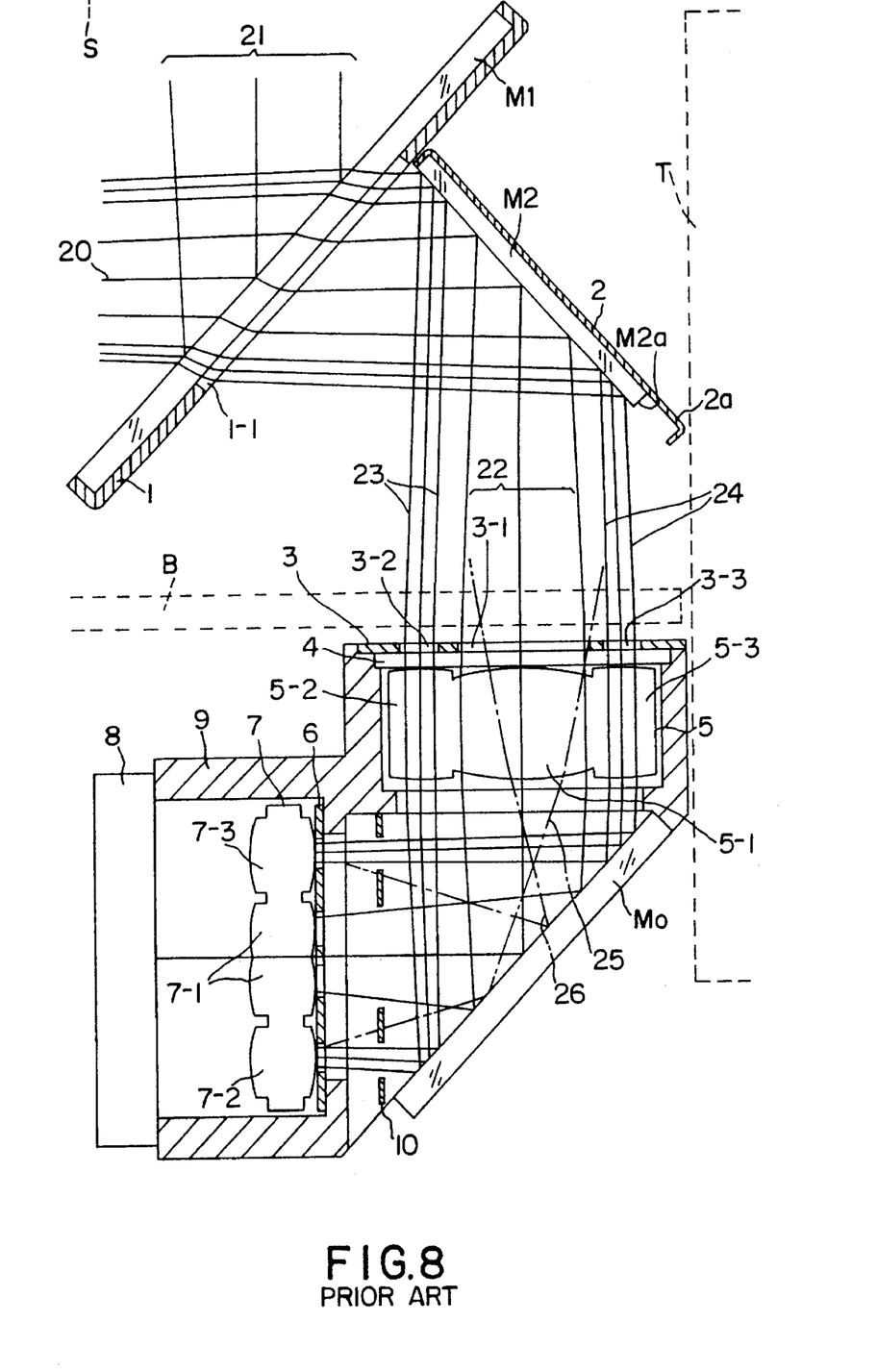
FIG. 8 is a cross-sectional diagram which depicts the manipulation of harmful light in a multi-area focus detection apparatus.

Referring now to FIG. 8, therein depicted is a cross-sectional diagram of a focal point detection optical system having the kind of multi-focus areas shown in FIG. 7. The elements that are arranged when mounted in a camera are indicated in the same manner as above. FIG. 8 demonstrates the focus detection state (view finder observation state), and the state wherein light fluxes that pass through the photographic lens are separated by semi-transparent main mirror M1 into light fluxes 21 for view finder observation and light fluxes 22 through 24 to be used. Observational light flux 21 is reflected in the direction of focusing screen S by main mirror M1, and light fluxes 22 through 24 to be used pass through main mirror M1 and are bent and/or deflected in a direction of mirror box bottom surface B by fully reflective sub-mirror M2. The two mirrors M1 and M2 are supported by mirror holders 1 and 2 which are configured to have rotational operation by which they spring up and around their respective rotational axes (not shown in the figure) in order to capture or avoid the photographic light fluxes depending on the camera sequence.

Provided on main mirror holder 1 is opening 1-1 which leads light fluxes 22 through 24 to be used that have passed through main mirror M1 to sub-mirror M2. The basic composition of the focus detection optical system of FIG. 8 is nearly the same as is depicted in FIG. 5. That is, light fluxes 22 through 24 to be used pass through field mask 3 and field lens 5 and are deflected in the direction of the photographic lens by deflection mirror Mo. Thereafter, the fluxes pass through aperture mask 6 and re-imaging lens 7 to arrive at CCD line sensor 8. Moreover, infrared cut filter 4 used for the purpose of compensating the comparative visual sensitivity of CCD line sensor 8 is positioned directly before field lens 5. The aforementioned structures are fixed in their respective positions in focus detection holder 9, and taken as a whole they constitute the focus detection module.

As previously described, because there are off-axial areas above and below the optical axis on focal plane, corresponding to each area there are three focus detection optical systems that are situated on the cross section which includes optical axis 20 of the photographic lens and the optical axis of light fluxes 22 through 24 to be used. Re-imaging lens 7 has a total of two sets of lenses: because there are areas that are extended horizontally, one set of lenses 7-2 and 7-3, which correspond to areas off the optical axis, are perpendicular to the cross section of the diagram; and because one area has a cross shape, one set of lenses 7-1, which corresponds to the central area on the optical axis, is perpendicular and parallel to the cross section of the diagram.

Attention is now paid to the harmful light that is produced and that causes harm to focus detection, in a multi-area focus detection optical system which incorporates the above-mentioned structures. First, light rays, which pass through opening 3-1 of field mask 3 and field lens 5-1 corresponding to the central area on the optical axis but which are incident on re-imaging lenses 7-2 and 7-3 corresponding to the off-axial areas above and below the optical axis, are represented by reference numerals 25 and 26 which are indicated by dotted lines in FIG. 8. As illustrated in Japanese Patent Publication No. 63-289513, to shade these harmful light rays 25 and 26 before they are incident on re-imaging lens 7, light shielding member 10, which has three openings through which light fluxes 22 through 24 to be used may pass, can be positioned between deflection mirror Mo and re-imaging lens 7.

The problems of the aforementioned structures which are addressed by the present invention are described in regard to FIG. 8. The harmful light, which passes through openings 3-2 and 3-3 of field mask 3 and field lenses 5-2 and 5-3 corresponding to the off-axial area above and below the optical axis but which is incident on re-imaging lens 7-1 corresponding to the central area on the optical axis, is represented by reference numerals 27 and 28 which are indicated by the dotted lines in FIG. 9.

Harmful light rays 27 and 28 have already doubled up with light fluxes 22 through 24 to be used as indicated by the solid lines between deflection mirror Mo and re-imaging lens 7. When attempting to shade such harmful light at the position indicated by h, the light fluxes to be used are also shaded, thereby making it impossible to shade only the harmful light. Moreover, even if the shade member is affixed to the surface of deflection mirror Mo, the range in which harmful light 27 and 28 are reflected is doubled up in the range in which light fluxes 22 through 24 to be used are reflected at the surface of deflection mirror Mo. As such, it is not possible to completely shade only the harmful light. Such doubling up of harmful light fluxes with the light fluxes to be used of the central area on the optical axis easily occurs when the central area on the optical axis is a cross shape, and the width of the light flux 22 to be used of the central area on the optical axis in the cross sectional direction of FIG. 5 is large.

Figure 9:
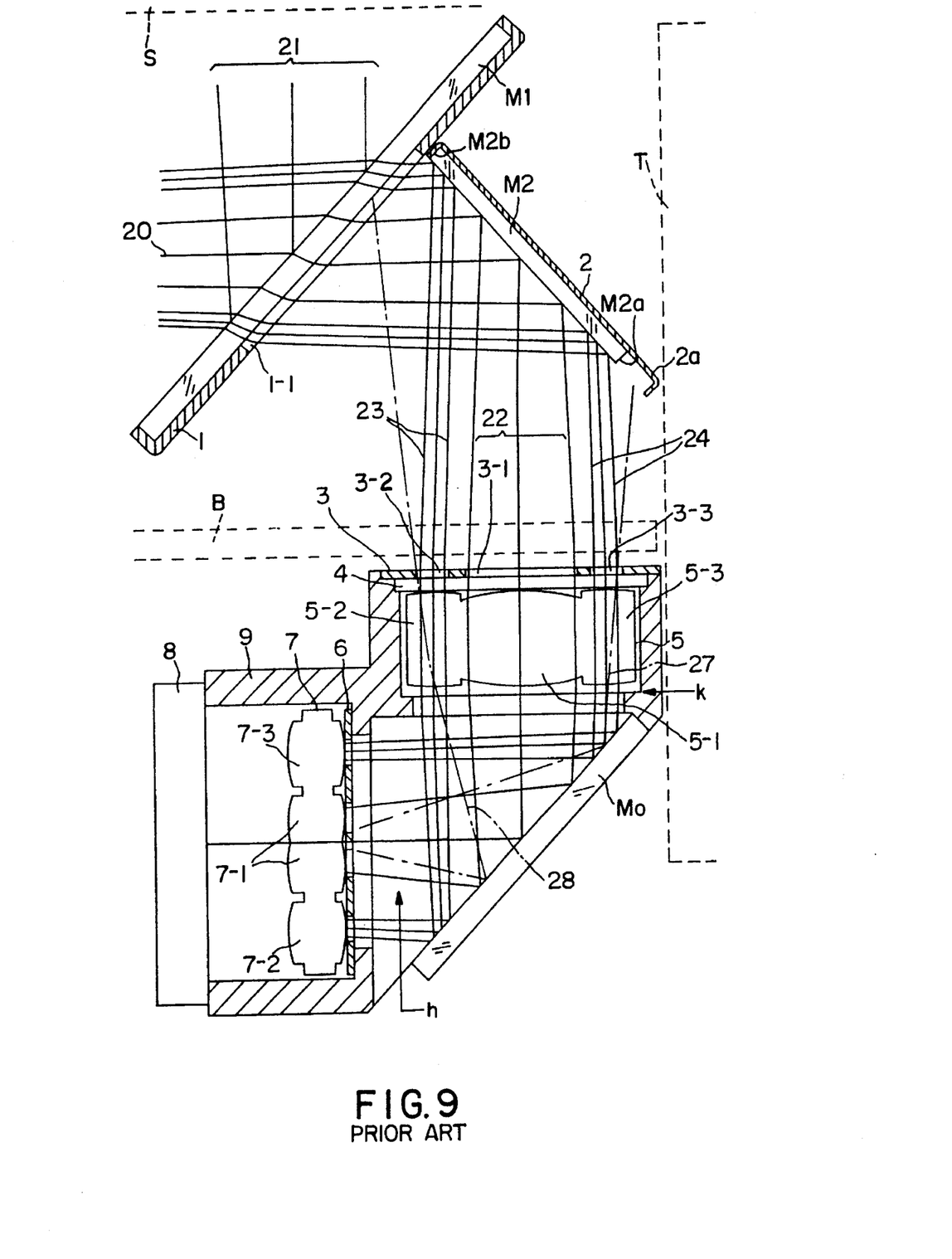
FIG. 9 is a cross-sectional diagram which depicts another example of harmful light manipulation in a multi-area focus detection apparatus.

Moreover, it is still not possible to shade only the harmful light at a position between field lens 5 and deflection mirror Mo because the position comes immediately after field lens 5 and light fluxes 22 through 24 to be used and harmful light 27 and 28 are barely separate.

Other known methods try to shield harmful light 27 and 28 before they are incident on the focus detection module. Harmful light 27 is light that enters from an area between shutter T and end M2a of sub-mirror M2. Because focusing screen plate S is not positioned above this area, them is almost no reverse incident light from the view finder eye piece that falls between sub-mirror M2 and shutter T. Moreover, even if the aforementioned space were little and if end 2a of the sub-mirror holder is extended beyond sub-mirror M2 as shown in FIG. 8, and made to have an extremely small gap with shutter T, it is possible to almost totally prevent light from being incident on field lens 7-2. Consequently, harmful light 27 can be shaded prior to falling on the focal point detection module.

However, when it comes to harmful light 28, this is light that passes through the semi-transparent main mirror M1 at a place beyond end M2b on the photographic lens side of sub-mirror M2, and which comes through opening 1-1 of main mirror holder 1. Among the reverse incident light rays from the view finder eye piece, this is light that passes nearly straight through the center of focusing screen S. Such light is the strongest part of the reverse incident light and cannot be shaded at the focusing screen part or the main mirror part because the parts through which this reverse incident light comes, namely the semi-transparent part of main mirror M1 and the opening part 1-1 of main mirror holder 1, am also the parts through which light flux 23 passes in order to be used.

Consequently, there is a problem in multi-area focus detection optical systems which have off-axial focus detecting areas on a focal plane above and below the optical axis. In particular, such multi-area focus detection optical systems often allow harmful light to pass through a main mirror by passing through the center of the focusing screen plate from the view finder eye piece. Such harmful light that is incident upon the focus detection module cannot be prevented by inserting a planar shade member which has opening parts for only the number of light fluxes to be used either prior to becoming incident on the focus detection module or between the field lens and the re-imaging lens in the focus detection module as is proposed in Japanese Patent Publication No. 63-289513.

The present invention takes the above-mentioned problems into consideration, and has the purpose of offering a focus detection apparatus that can effectively shade the harmful light of a multi-area focus detection apparatus that has off-axial focus detecting areas above and below the optical axis using an apparatus that can be adapted to be mounted in a camera, etc.

SUMMARY OF THE INVENTION

It is an object of the present invention to solve the above-mentioned problems of the known focus detection apparatuses.

It is yet a further object of the present invention to provide a focus detection apparatus that effectively manages harmful light by efficiently using space near a deflection mirror maintained in a camera having a multi-area focus detection apparatus.

These and other objects of the present invention are achieved by a focus detection apparatus adapted to reform images of light fluxes that pass through differing regions of a photographic lens into a pair of images on light receiving element arrays by using, for each pair of images, a field mask, a field lens, a pair of re-imaging lenses, and an aperture mask having a pair of aperture openings provided in the vicinity of the pair of re-imaging lenses. The focus detection apparatus has multiple focus detection blocks that detect the focus condition of the photographic lens from positions relative to the pairs of images. Additionally, the focus detection apparatus is further adapted to detect the focus condition of multiple areas on an focal plane. The focus detection apparatus comprises a deflection mirror positioned between the field lens and the pair of re-imaging lenses. The deflection mirror causes the light fluxes to be deflected at nearly right angles for focus detection. Finally, a light shielding member is positioned in a triangular space determined by a beam of light that is closest to the pair of re-imaging lenses, a beam of light that is closest to the field lens and a reflecting surface of the deflection mirror,

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
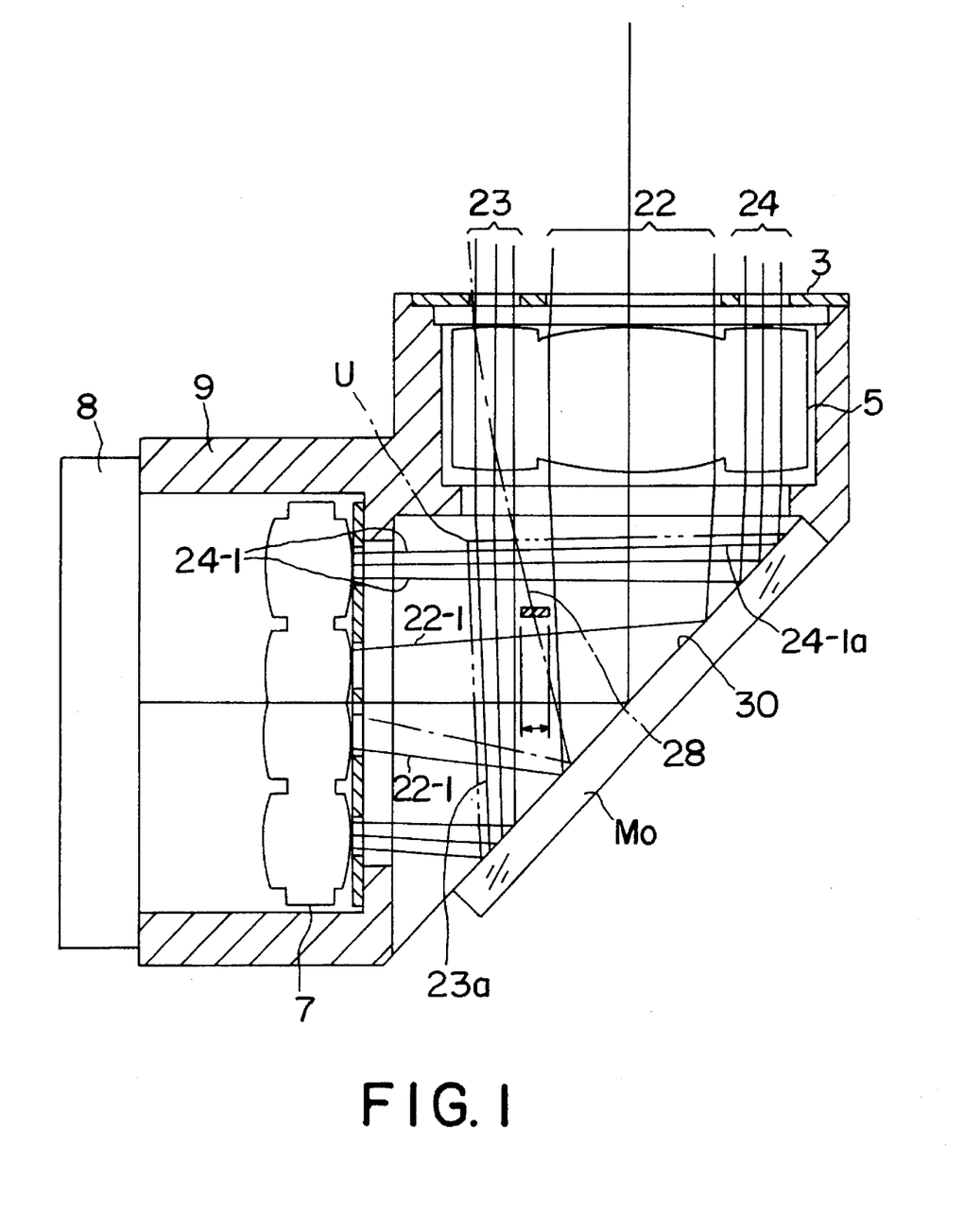
FIG. 1 is a cross sectional diagram which shows the configuration of a first embodiment of a focus detection apparatus according to the present invention.
Figure 2:
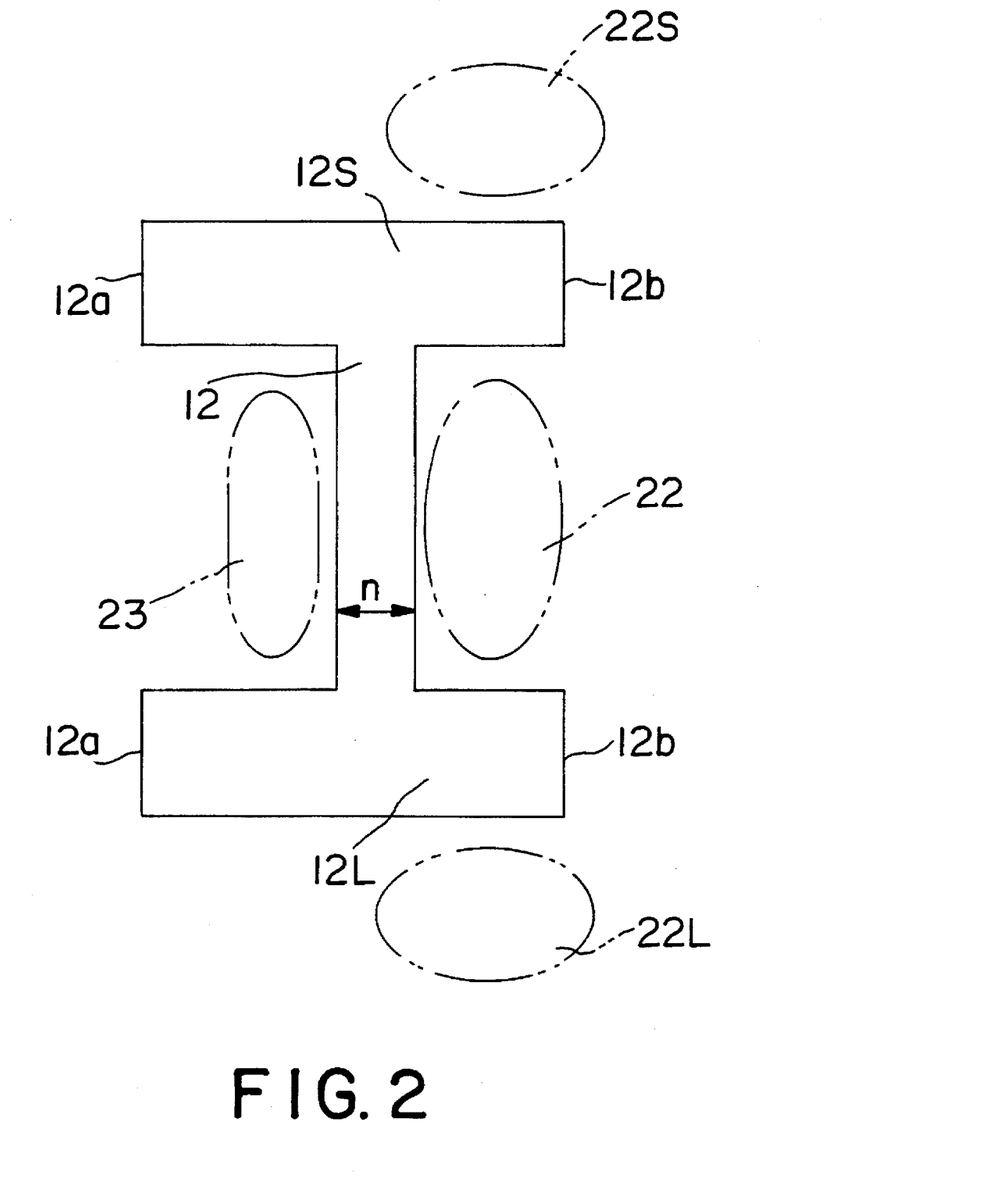
FIG. 2 is a top view which shows the shape of the light shielding member depicted in FIG. 1.

A first embodiment of a focus detection apparatus according to the present invention is shown and described with reference to FIGS. 1 and 2. In FIGS. 1 and 2, references are made to pads which correspond to the parts of the prior art focus detecting apparatus depicted in FIG. 9, and, as such, a redundant, second explanation of such parts will be omitted.

In order to prevent the incidence of harmful light 28 on re-imaging lens 7 of the central area on the optical axis, light shielding member 12 is arranged in space U which has a triangular cross-sectional shape determined by reflective plane 30 of deflection mirror Mo. Light beam 23a is the light flux 23 to be used that is closest to re-imaging lens 7, and light beam 24-1a is the light flux 24 to be used that faces re-imaging lens 7 from deflection mirror Mo and is closest to field lens 5.

The orientation of light shielding member 12 is nearly parallel to field mask 3. Moreover, the size to the left and the right in the diagram shall be width n which is restricted between light fluxes 22 and 23 to be used and which reaches from field lens 5 to deflection mirror Mo. The position up and down in the diagram is between light fluxes 24-1 and 22-1 (reflected light of light flux 22) to be used which reaches between deflection mirror Mo to re-imaging lens 7. There is no need to provide light shielding member 12 at a position outside of the light flux 24 since light flux 22 to be used reaches from field lens 5 to deflection mirror Mo because with deflection mirror Mo there is extremely little space and there is no relationship to harmful light 28 which is to be shaded, By making light shielding member 12 have the aforementioned width in its position, only the harmful light is shaded without shading either the light flux to be used heading from field lens 5 to deflection mirror Mo or the light flux to be used heading from deflection mirror Mo to re-imaging lens 7.

Moreover, as shown in FIG. 2, the planar shape of light shielding member 12 need only be of width n to fit between light fluxes 22 and 23 to be used. If made into an H shape by taking away the areas which have no relationship with light flux and fixed to focus detection holder 9 at ends 12a and 12b, a light shielding member of width n can be held between the two light fluxes 22 and 23. Moreover, as shown in FIGS. 5A–5C and 6, if a focus detecting area is provided to the right and left of the central area on the optical axis, the light fluxes of the right and left areas come to positions like 22S and 22L, and wide parts 12S and 12L of light shielding member 12 can maintain the function of shading the harmful light between the left and right areas.

Figure 3:
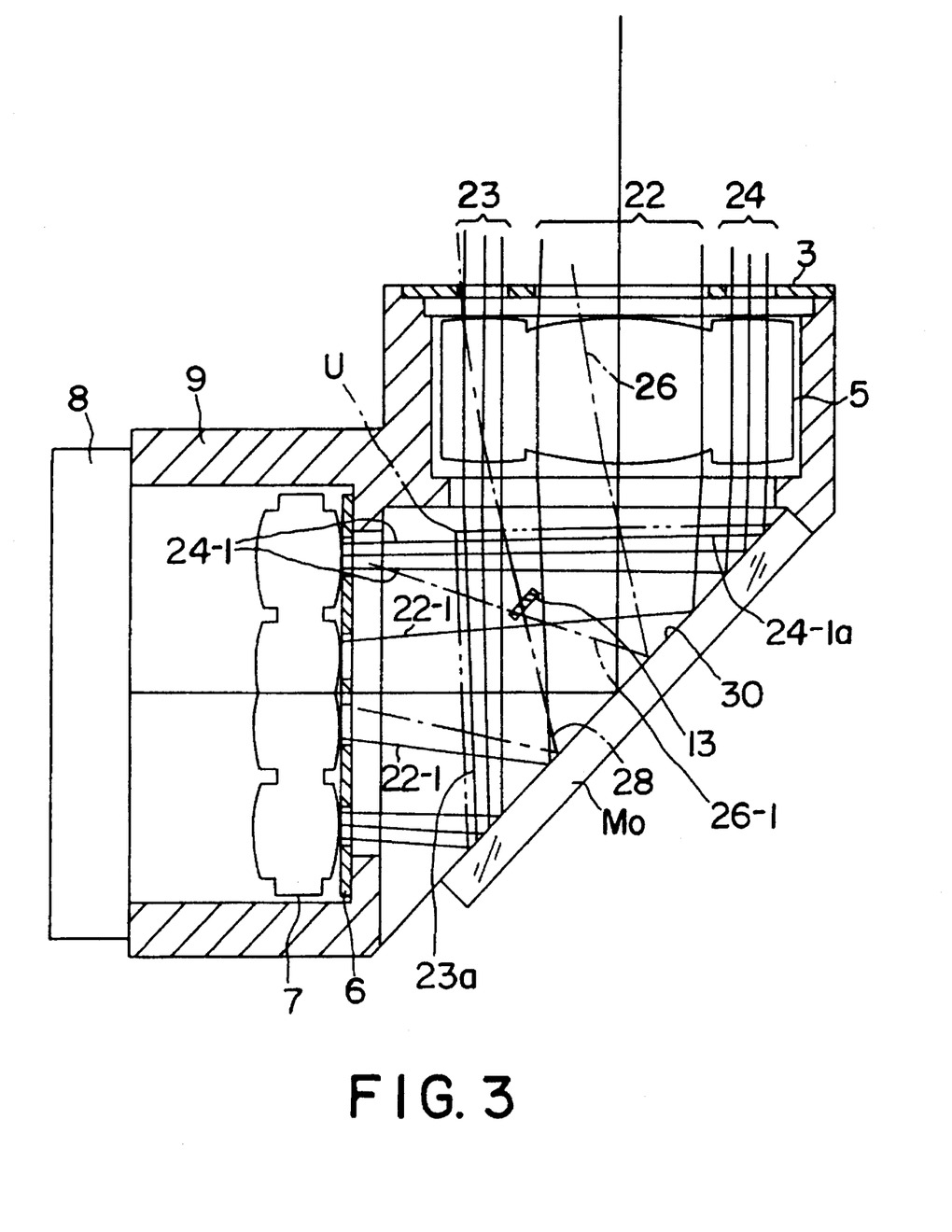
FIG. 3 is a cross-sectional diagram which shows the configuration of a second embodiment of a focus detection apparatus according to the present invention.

Referring now to FIG. 3, therein depicted is a cross section of a second embodiment of a focus detection apparatus according to the present invention. Having the same general location and width as the first embodiment, light shielding member 13 shades harmful light 28 and is arranged to face roughly parallel with deflection mirror Mo. When oriented this way, light shielding member 13 can certainly shield harmful light 28, but among the light fluxes reflected by deflection mirror Mo and facing re-imaging lens 7, light shielding member 13 can simultaneously shade reflected light 26-1 of harmful light 26 as shown in FIG. 3. In particular, by orienting light shielding member 13 such that it has a position in a direction substantially parallel to deflection mirror Mo and to an angle less than a right angle to aperture mask 6, light shielding member 13 can simultaneously function to shield light coming from field lens 3 and the harmful light reflected off of deflection mirror Mo. Consequently, it is possible to prevent harmful light 26 at the same time that light shielding member 13 prevents harmful light 28.

Light shielding member 10 (FIG. 8) has the purpose of preventing harmful light 25 and 26. The part of light shielding member 10 that has the purpose of shading harmful light 26 may be made smaller or even omitted from the structure depicted in FIG. 3. Additionally, the planar shape of light shielding member 13 and the method of holding it are the same as in the first embodiment.

The embodiments described above illustrate that it is possible to prevent harmful light in a focus detection apparatus disposed in a multi-area focus detection apparatus having off-axial focus detecting areas above and below an optical axis in addition to the center of an imaging area, of a camera's photo-optical system. The present invention prevents harmful incident light that is incident upon a re-imaging lens of a central area from the field lens of the off-axial area below the optical axis and which is naturally produced by the focus detection apparatus having an off-axial area below the optical axis. Such advantages are realized by effectively arranging a light shielding member in the space of the triangular cross-sectional shape that is formed by the most exterior light beams of the light fluxes to be used and the reflective surface of a deflection mirror when mounted in a camera. Such a triangular space may be found in a camera having a deflection mirror arranged between a field lens and a re-imaging lens.

Also, the present invention has the effect that the number of harmful light shielding members can be reduced since shade members can be appropriately directed and shaped. As such, shade members can shade not only the aforementioned harmful light, but simultaneously shade the harmful light that is incident on a re-imaging lens of an off-axial area above and below the optical axis coming from the field lens of the central area. If there is an off-axial area to the right and left of the optical axis, all or part of the harmful light produced between the central area and the off-axial area to the right and left of the optical axis can be shaded.

Although a few preferred embodiments of the present invention have been shown and described, it would be appreciated by those skilled in the art that changes may be made in these embodiments without departing from the principles and spirit of the invention the scope of which is defined in the claims and equivalents thereof.

What is claimed is:

1. A focus detection apparatus adapted to reform images of light fluxes that pass through differing regions of a photographic lens into a pair of images on light receiving element arrays by using, for each pair of images, a field mask, a field lens, a pair of re-imaging lenses, and an aperture mask having a pair of aperture openings provided in the vicinity of the pair of re-imaging lenses, the focus detection apparatus having multiple focus detection blocks that detect the focus condition of said photographic lens from positions relative to said pairs of images, the focus detection apparatus comprising:

a deflection mirror positioned between said field lens and said pair of re-imaging lenses, said deflection mirror causing said light fluxes to be deflected at nearly right angles for focus detection; and a light shielding member completely positioned within a triangular space determined by a beam of light to said deflection mirror for focus detection that is closest to said pair of re-imaging lenses, a beam of light from said deflection mirror for focus detection that is closest to said field lens and a reflecting surface of said deflection mirror.

2. The focus detection apparatus according to claim 1, wherein said light shielding member is arranged so that at least one part of its outline is positioned within the light fluxes for focus detection of neighboring blocks among said focus detection blocks.

3. The focus detection apparatus according to claim 1, wherein said light shielding member is a flat plate member which is positioned nearly parallel to said field mask.

4. The focus detection apparatus according to claim 1, wherein said light shielding member is a flat plate member which is positioned nearly parallel to said deflection mirror.

5. The focus detection apparatus according to claim 1, wherein said field lens for the pair of images is disposed at nearly a right angle to said pair of re-imaging lenses for the pair of images.

6. The focus detection apparatus according to claim 1, wherein said deflection mirror deflects said light fluxes for focus detection in a direction nearly parallel to the optical axis of said photographic lens.

7. The focus detection apparatus according to claim 1, wherein the apparatus is capable of detecting a focus condition in multiple areas which are variously aligned in differing directions within a focal plane, said light shielding member simultaneously shading differing harmful light that is produced between multiple light detection blocks that correspond to the multiple focus condition detecting area aligned in various directions.

8. A focus detection apparatus adapted to reform images of light fluxes that pass through differing regions of a photographic lens into a pair of images on light receiving element arrays by using, for each pair of images, a field mask, a field lens, a pair of re-imaging lenses, and an aperture mask having a pair of aperture openings provided in the vicinity of the pair of re-imaging lenses, the focus detection apparatus having multiple focus detection blocks that detect the focus condition of said photographic lens from positions relative to said pairs of images, the focus detection apparatus comprising:

a deflection mirror positioned between said field lens and said pair of re-imaging lenses, said deflection mirror causing said light fluxes to be deflected at nearly right angles for focus detection; and a light shielding member completely positioned within a space determined by two outermost points of the deflection mirror and an intersection point of two beams of light among the light fluxes heading towards the deflection mirror deflected by the two outermost points of the deflection mirror.

9. The focus detection apparatus according to claim 8, wherein said light shielding member is arranged so that at least one part of its outline is positioned within the light fluxes for focus detection of neighboring blocks among said focus detection blocks.

10. The focus detection apparatus according to claim 8, wherein said light shielding member is a flat plate member which is positioned nearly parallel to said field mask.

11. The focus detection apparatus according to claim 8, wherein said light shielding member is a flat plate member which is positioned nearly parallel to said deflection mirror.

12. The focus detection apparatus according to claim 8, wherein said field lens for the pair of images is disposed at nearly a right angle to said pair of re-imaging lenses for the pair of images.

13. The focus detection apparatus according to claim 8, wherein said deflection mirror deflects said light fluxes for focus detection in a direction nearly parallel to the optical axis of said photographic lens.

14. The focus detection apparatus according to claim 8, wherein the apparatus is capable of detecting a focus condition in multiple areas which are aligned in differing directions within a focal plane, said light shielding member simultaneously shading harmful light that is produced between multiple light detection blocks that correspond to the multiple focus condition detecting area aligned in various directions.

\* \* \* \* \*